United States Patent
Thorell (10) Patent No.: US 9,157,527 B2
(45) Date of Patent: Oct. 13, 2015

(54) ROTATING HYDROSTATIC TRANSMISION

(76) Inventor: Sven Christer Thorell, Vasteras (SE)

( * ) Notice: Subject to any disclaimer, the term of this patent is extended or adjusted under 35 U.S.C. 154(b) by 534 days.

(21) Appl. No.: 13/261,231

(22) PCT Filed: Oct. 21, 2010

(86) PCT No.: PCT/SE2010/000253
§ 371 (c)(1),
(2), (4) Date: Mar. 28, 2012

(87) PCT Pub. No.: WO2011/049506
PCT Pub. Date: Apr. 28, 2011

(65) Prior Publication Data
US 2012/0198830 A1 Aug. 9, 2012

(30) Foreign Application Priority Data
Oct. 21, 2009 (SE) ...................................... 0901362

(51) Int. Cl.
| | |
|---|---|
| *F16H 61/4096* | (2010.01) |
| *F16H 61/421* | (2010.01) |
| *F16H 61/431* | (2010.01) |
| *F16H 61/02* | (2006.01) |
| *H01F 38/18* | (2006.01) |

(52) U.S. Cl.
CPC .......... *F16H 61/4096* (2013.01); *F16H 61/421* (2013.01); *F16H 61/431* (2013.01); *F16H 2061/0255* (2013.01); *H01F 38/18* (2013.01)

(58) Field of Classification Search
CPC . F16H 61/421; F16H 61/431; F16H 61/4096; F16H 2061/0255; H01F 38/18
USPC ............. 60/416, 490, 491, 492; 92/12.2, 12.1
See application file for complete search history.

(56) References Cited

U.S. PATENT DOCUMENTS

| | | | | |
|---|---|---|---|---|
| 3,293,848 | A | * | 12/1966 | Kuze ................................ 60/427 |
| 6,454,033 | B1 | * | 9/2002 | Nathan et al. ................. 180/65.1 |
| 2007/0251736 | A1 | * | 11/2007 | Bergmann et al. ........... 180/53.4 |
| 2008/0093152 | A1 | * | 4/2008 | Gray ............................. 180/307 |

FOREIGN PATENT DOCUMENTS

EP        0481022 A1 * 11/1995

* cited by examiner

Primary Examiner — Thomas E Lazo (57) ABSTRACT

A hydrostatic transmission in the shape of a shaft/rotor comprising two hydraulic pumps/motors with adjustable displacement connected in a closed hydraulic system. The displacement of the pumps/motors is adjusted by adjusting the angle of swash plates of the pumps/motors. The control and regulation of the angle of the swash plates is done by transferring a signal by two separate pulse width modulated DC fed pulse trains. The hydrostatic transmission includes oil accumulators connected to the hydraulic pumps/motors.

11 Claims, 8 Drawing Sheets

ROTATING HYDROSTATIC TRANSMISION

FIELD OF TECHNIQUE

The range of application of the invention is applications and proceedings where you want to continuously control and regulate power in to a shaft/rotor (4) and/or from a power to one of the two ends of the shaft/rotor (2, 6), and split it in various continuous ratio of power to the two ends of a shaft/rotor or want to regulate the ratio of velocity speed and torque of power out from the shaft/rotor out of a power in to one end of the two ends the shaft/rotor.

It means it could be used in a drive chain between a combustion motor, as a shaft to or integrated in a rotor in an extra electrical motor/generator, and in the out going drive shaft on a vehicle.

When it's used in that way it could be used to add power as well as take care of lost energy at braking.

It means it could be direct integrated as a rotor in an electrical motor/generator into a driveshaft to get torque vectoring as well.

Torque vectoring means control the torque individually between right and left side of the drive shaft Torque vectoring also means an effective way to take care of the different torques on the wheels when you brake the vehicle and transferring back energy.

It means it could be used as a shaft or rotor to/in an generator to control and regulate the velocity speed and torque in to the generator to a better usable ratio than the one in of the velocity speed and torque for power out from the generator. An example is in windmills.

The advantages are less total weight, compact and less mechanical losses and hydraulic losses than operation of devices today, for the same type of application.

The Position of the Technique Today

Today there is three main, propulsion and regenerating concepts of electrical vehicles and hybrid vehicles, seen in practice use.

Figure 11:
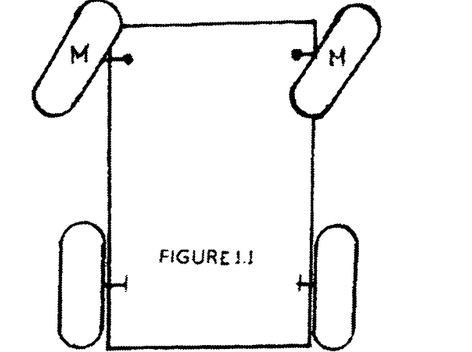
Figure 12:
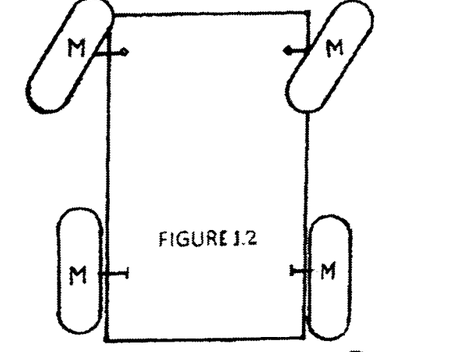

The first one is done by two motors on one drive shaft or more and energized from a battery or capacitor or a generator (FIGS. 1.1 and 1.2).

Figure 13:
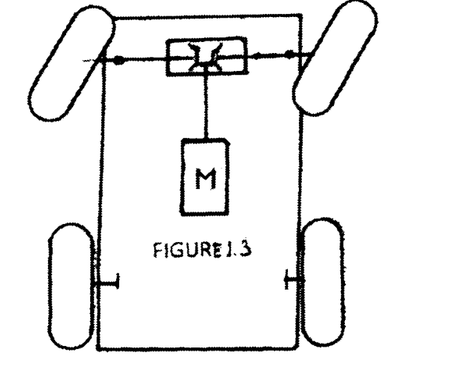

The second and the simplest concept the propulsion is done just by an electrical motor replacing the normal combustion engine or being an extra motor in the drive chain with gearbox and differential to one or two drive axles (FIG. 1.3). The third one is a technique where you let the wheel motors or the single motor concept be replaced by hydraulic motors driven from the electrical motor by a pump with variable displacement. A variant not seen in practice of a rotating hydrostatic transmission is i.e. EP 0481022B1.

The steering is done by turning one or two or even more pair of wheels.

To day there are also vehicles with only one shaft and two electrical motors at each wheel. The shaft is both a drive shaft and a steering shaft.

There are driving and steering in other vehicles as well, but with more than one wheel shaft, for example lawn mowers and special trucks.

In wind mills today you have a mechanical gearbox or hydrostatic transmission in front of the generator to get the desired torque and velocity speed in to the generator. There are even mechanisms to adjust the angle of the blade of propeller.

To day when an electrical motor is used in a hybrid vehicles in the drive chain between a combustion motor and the drive shaft to add power and to take care of lost energy at lowering the speed they use a mechanical solution. They technique to control and regulate is by a planetary gearbox design.

Solved Problems

Figure 14:
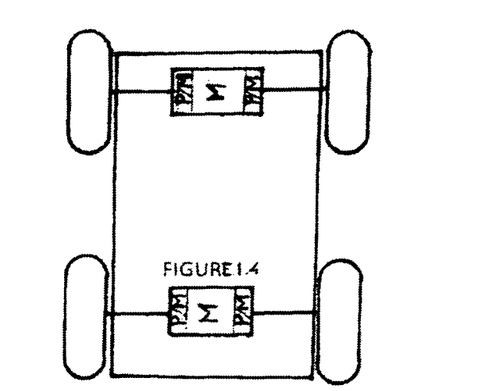
Figure 15:
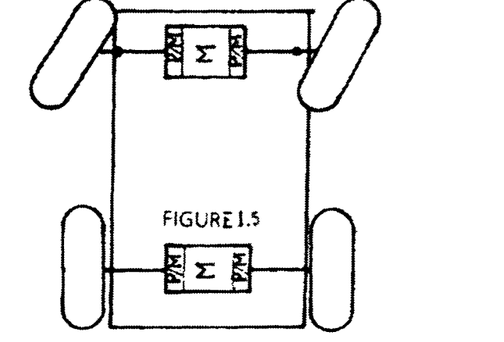
Figure 16:
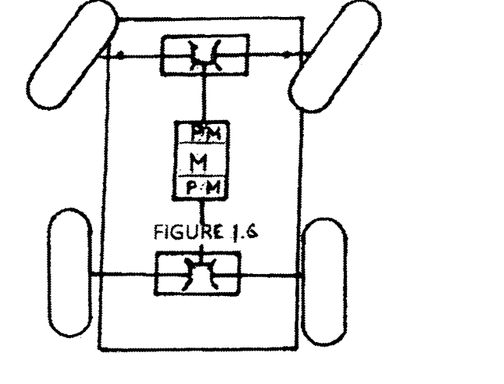

The suggested concept/invention integrated in the drive shaft, see FIGS. 1.4 to 1.6, can replace a two motor concept with one smaller motor per drive shaft and a one motor concept the differential and the differential lock function.

In the two motor concept it means, less weight due to a need of a smaller motor and less one power control units, less weight at the wheels, compactness and probably less demand of energy out of less weight and lower total cost. The cost advantage will probably increase at more power.

In a one motor concept it means a mechanical differential less and the already existing differential lock function, less mechanical friction losses when there is less gears involved, less weight and more compactness and probably energy and lower cost.

In the generator concept you will be able to control the velocity speed of the generator in a compact way, probably at less loss due to less mechanical technique and a more optimized generator, lower total weight due to less mechanical technique and smaller electrical devices, and together lower cost. The cost advantage will probably increase at more power.

The description above describes how the concept/invention differs to known applications and the problem/disadvantages it solves but not to known other techniques. There is other known techniques, but not yet seen in use as practical applications. The invention could be seen or called "a rotating hydrostatic transmission where a regulation of power in to the shaft/rotor, and a split of power in to the two shaft ends and at power out of the shaft/rotor regulation of ratio of velocity speed/torque out of shaft/rotor are controlled in an outside wireless contacted master controller. It's a long sentence but it's a summary of the invention.

One known technique is mentioned in patent EP 0481022B1 "Hydraulic differential in an electrical motor". It contains similar parts and technique but the technique to control the dynamics of the device or put in a system, the problems of a rotating tank, to pressurize the accumulator and where to put the filter and to solve the problem of leakage differs and are in some extent not practically solved or shown.

The use in a generator and the solved problems when its integrated in a generator is not mentioned. These are some characteristics that differ between my claims and the known technique/patent/above.

Another known technique similar to the one used here in this concept/invention is the one in patent se 529678 C2 where it is mentioned how to transfer signals and power with a specific pulse modulation over an air gap. In my concept/invention the claims contains techniques to use the variable pulse width at variable frequencies. That is not mentioned there.

A variable pulse width at variable frequencies in comparison with variable pulse width at fixed frequency create an advantage due Ito they won't be a variation in power. That's one more problem solved.

LIST OF FIGURES

FIG. 1 shows different motor concepts for propulsion and steering.

DETAILED DESCRIPTION OF THE INVENTION

The suggested invention characterized by a master controller/processor function for controlling and regulating a hydrostatic transmission in a shaft/rotor (4) to or in an electrical motor or generator. The job for the master controller function which is situated outside the shaft/rotor is to control and regulate from the outside the shaft/rotor adjustable incoming power or a power from the shaft/rotor delivered.

The same master controller/processor even controls/regulates the split of the power to the two ends (2, 6) of the shaft/rotor (4) or when the power is delivered from the one or the two ends of the shaft/rotor it controls and regulates the split of velocity speed and torque ratio of the shaft/rotor.

The hydrostatic transmissions in a shaft/rotor (4) to or in an electrical motor or generator consist of a pair of axial pumps and motors with adjustable displacement (3,5) mechanical bolted "back to back. Not really physically "back to back", inlet and outlet connections between them separate them. That separation is designed out of a need of a space or a room there for other small necessary devises as valves, tank/accumulators, filter, electronics, servo functions and a little more, mentioned later. The displacement of the axial pumps and motors in their cylinder barrels is adjusted by swash plates (7, 8) and the tilt/angle of them.

Figure 3:
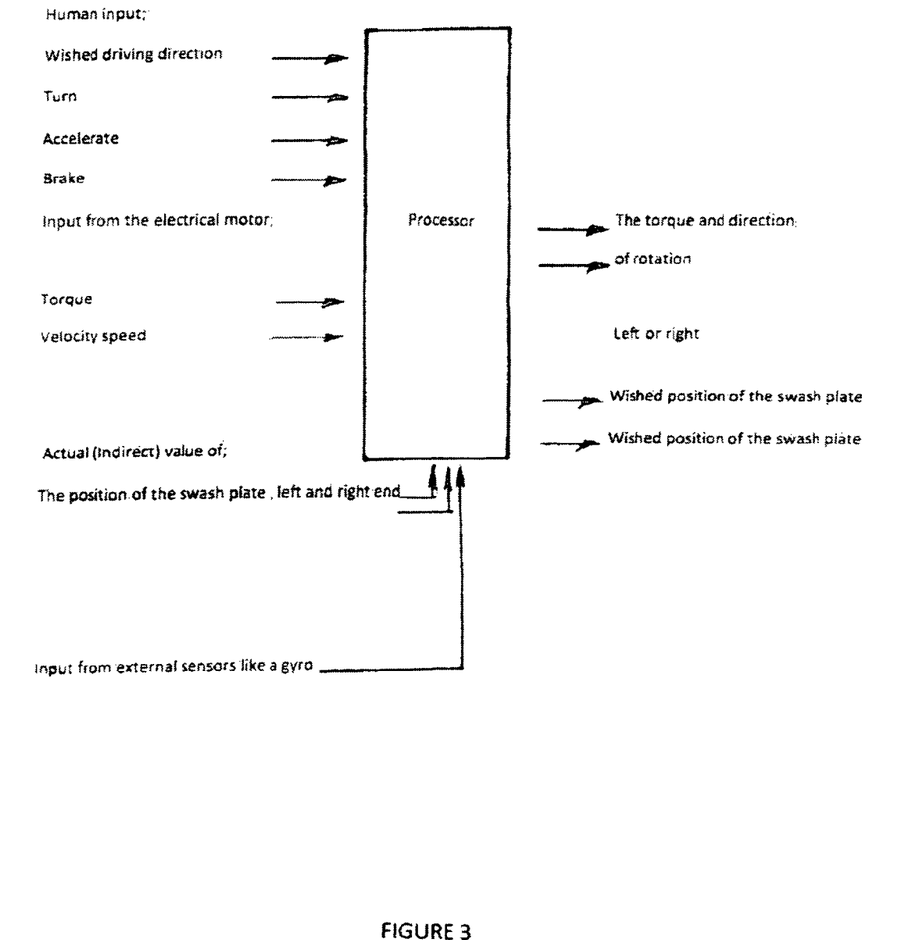
FIG. 3 shows input and output to and from the over all controller/processor in a schematic over all control and regulating process.
Figure 4:
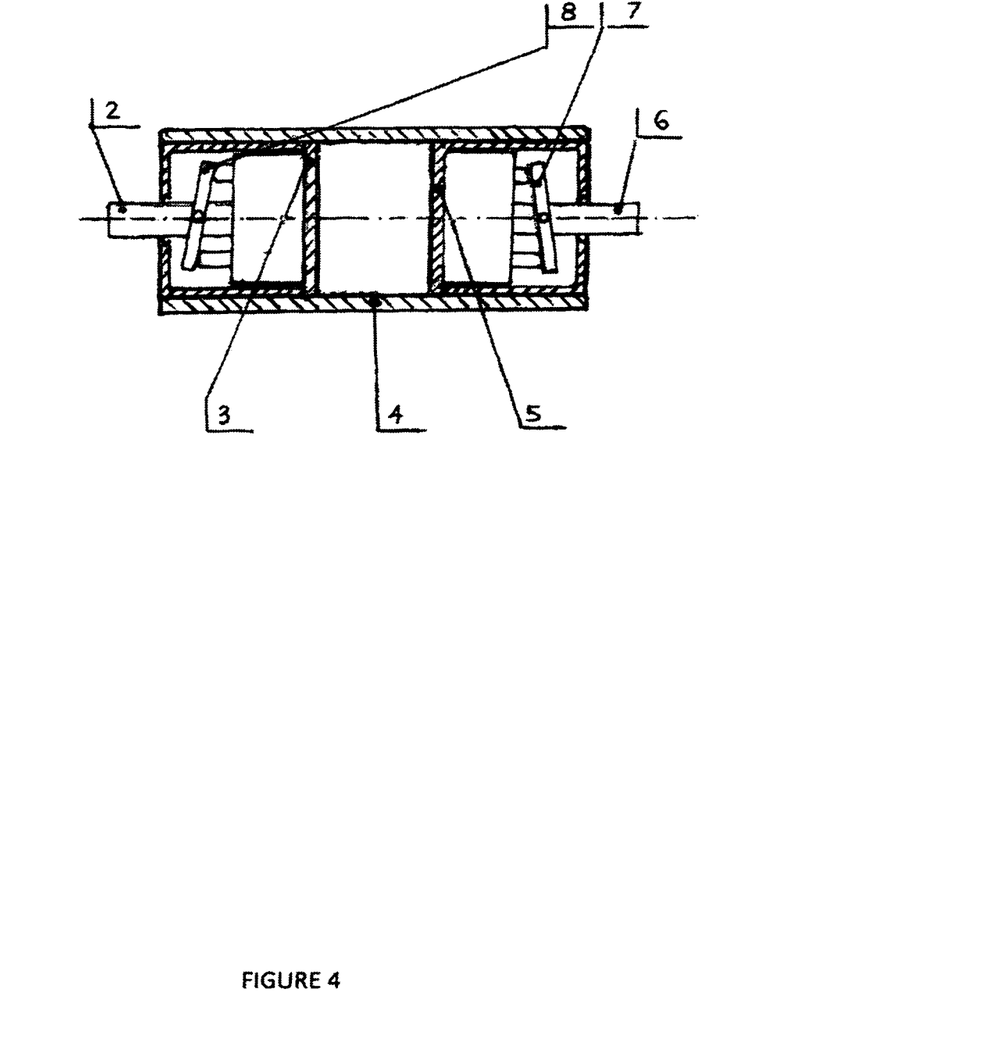
FIG. 4 shows a hydrostatic transmission in a rotor of symmetrical axis with axial piston pumps/motors with adjustable displacement.

The outer case of the hydrostatic transmission forms the outer shell of the shaft or rotor. It could be further stabilized in a tube. An abbreviation for hydrostatic transmission is HST. The "input" to the master controller/processor is the parameters as the torque (current) and speed of velocity of the electrical motor or generator and rotation direction. Another "input" is the 'fictive' desired/wished position/tilt angle of the swash plates (7, 8) in the HST from for example a person, see FIG. 3. Even other outside input could be involved, like a gyro. The swash plates (7, 8) in the HST then control the torque of the two outgoing ends of the shaft/rotor (2, 6) by adjusting the adjustable displacement in the pumps and motors with adjustable displacement.

A directional valve, 4 ways-2 positions, between the pumps and the motor in the HST can even change the direction of flow of oil.

The master controller/processor function and the power supply into the shaft/rotor are done wireless.

The HST with adjustable displacement of the pumps and motors is a "closed circuit-closed loop hydrostatic system". It means the hydraulic system had to be filled up with oil, the leakage is important to control. The adjustable displacement of the pump and motors need to be controlled and regulated.

When the HST rotates it will be an extra problem with inner leakage. On the other hand the external leakage at the two outgoing shafts (2, 6) wouldn't be any big problem by using good sealing's there.

The internal leakage from the pressure side at every revolution the flow circulates in the system will be in need of taking care of otherwise a disturbing "lost motion" in the torque transfer will occur. The invention has solved the problems with the leakage, "lost of motion" and the risk of cavitations on the low pressure side. The invention will need a tank which manages to work without leakage when it rotates.

Figure 2:
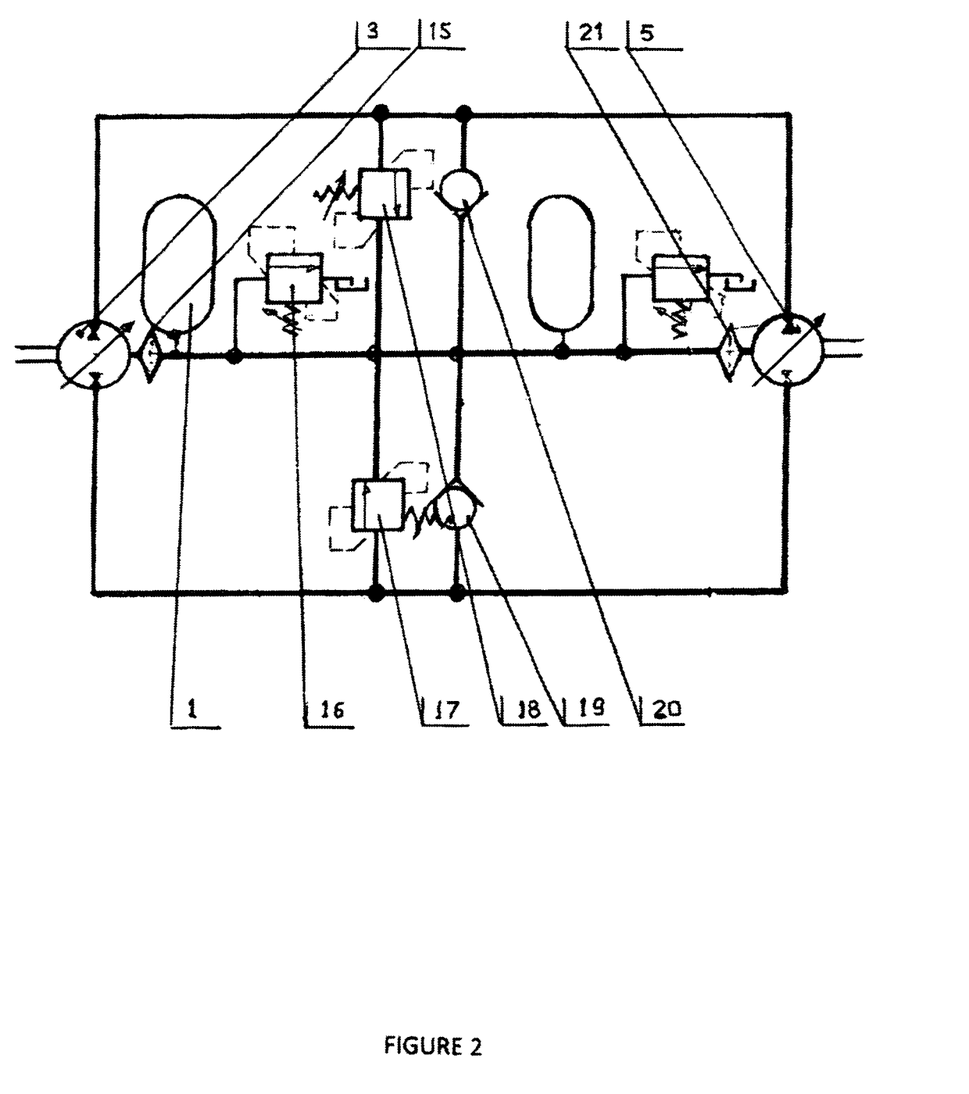
FIG. 2 shows a circuit diagram for a rotating hydrostatic transmission, a "closed loop and closed circuit with variable displacement motors/pumps" and two check valves, filters and relief valves and an accumulator with relief valve.
Figure 8:
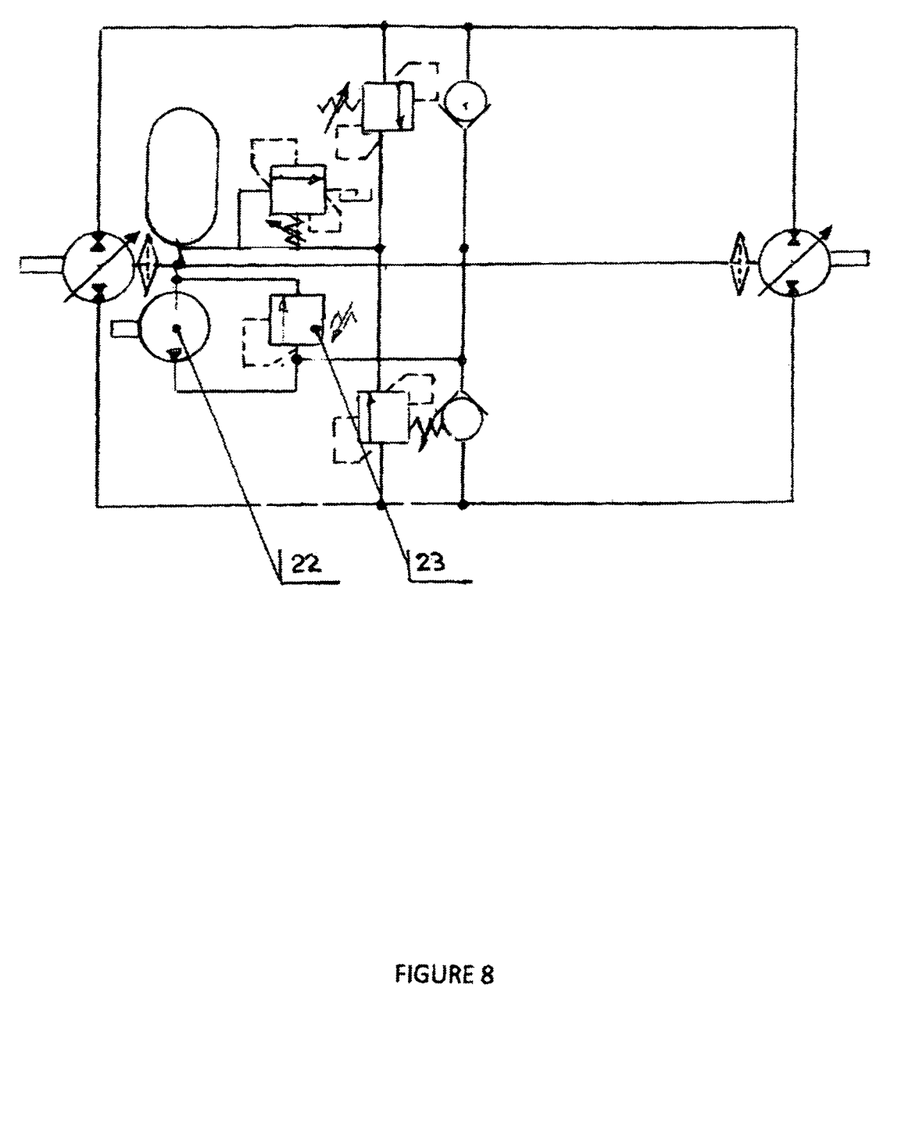
FIG. 8 shows a circuit diagram. like FIG. 2 with an electrical charge pump and relief valve.

A basic solution is an accumulator as tank (1) together with two check valves (19, 20) and a relief valve (16), see FIG. 2, it can be more than one tank/accumulator and one relief valve. A second solution is the prior one plus a charge pump (22) and a relief valve (23) after and to the tank/accumulator (1) and a connection to the check valves (19, 20) between, see FIG. 8. That's when a relief of pressure in the ease/housing of the pump/motor (3, 5) is necessary when more pressure is needed from the tank/accumulator to the check valves (19, 20) than the pressure in the case/housing of the pump/motor permits (3, 5). The power to the electrical driven charge pumps comes from one of the transfer of power over the coils at one of the ends of the two shafts and possible to switch "on" by the master controller/processor.

Figure 7:
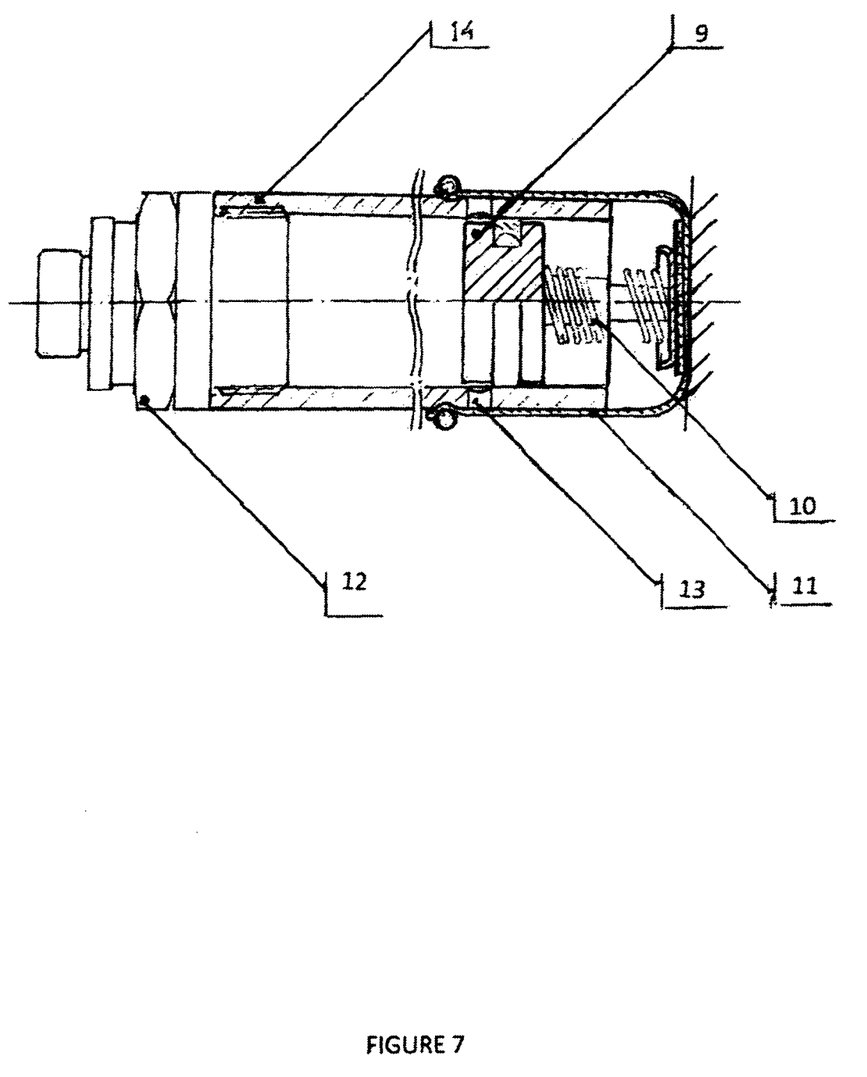
FIG. 7 shows the special accumulator

A more suitable accumulator as tank is the special tank/accumulator, see FIG. 7, which consists of connection (12), a cylinder (14), a low friction sealed piston (9). The piston is easily moveable to be able to take care of variations in the closed systems volume and to create by a compression spring (10) a force to overcome friction and to keep/maintain a specific necessary inner pressure. This specific inner pressure will open a check valve (19, 20) and replenish lost flow and prevent cavitations there, when it's higher on its side than on the other side of one of the check valve (19, 20). The distance the piston (9) can travel is limited, and is utilized in such a way, when very high pressure occurs it limits the travel distance, and at the end it allows the oil to enter out through drilled holes (13) at the end of the accumulator. It means it works like a relief valve as well. When that occurs and even when some leakage oil is lost from the closed circuit by some leakage oil between the piston (9) and the cylinder (14) it is caught up by an extra tank (11) designed like a flexible ballon fetch behind. The balloon had to be made of oil resistant rubber. The characteristic of the spring (10), the spring constant, had to be flack. Long movements will increase the force from the string. A big tank is an advantage. One way to increase the practical volume of the accumulator is to allow and arrange most of the whole free room between the pump and the motor to be a tank.

The shaft/rotor (4) consist of two back to back connected axial piston pumps/motors in a closed circuit-closed loop. The displacement of the axial pumps and motors is adjusted by the tilt/angle of the swash plates (7, 8). The tilt/angle of the swash plates are individually adjusted by inside the shaft/rotor situated slave controller or CMOS logic unit by their own and its algorithm and assisted by their own servo system inside but controlled/coordinated (getting a desired/wished tilt/angle) from outside by the master controller. The inside slave controller or CMOS logic works/acts out of a difference between a desired/wished tilt/angle of its swash plate (7, 8) and an actual tilt/angle. The servo system could work out of an electro hydraulic one or an electric actuators, electromagnets or a small electrical motor with gearbox, which actually do the force and movement to the swash plate (7, 8). Power to them is transferred from outside.

The desired/wished value of the tilt/angle and actual value of the tilt/angle correspond to active width of a individual pulse coming in/transferred to the shaft/rotor with constant or variable frequencies. In a pulse trains there will be the same. The pulses transferred to the shaft/rotor with the desired/ wished value of the tilt/angle can also be seen as a signal transfer. It's coming in/transferred wireless to the shaft/rotor, see more about it below.

The transfer to the shaft/rotor of necessary power for the logic, the servo systems and for other systems like the charge pump and flow directional valve, is done by utilizing the energy in the pulse width (Watts) and its height of the amplitude. A variation of the height of the amplitude above, say 5V, is a function used for voltage control like a switch with "on" and "off" The height of the amplitude at "off" is equal to the amplitude above the needed one needed for signal transfer. For example that's a function utilized to control the "on" and "off" of the directional valve, to control the direction of the flow. The transfer is done wireless to the shaft/motor. One way of doing it is by a Flyback topology, compare the technique in patent SE 529678 C2. There the transfer is done by induction from DC pulses from a fixed primary coil (24) to a secondary coil (25), see FIG. 6, fixed to the shaft/rotor in concentric position to each other and very close to each other to create as little as possible of leak inductance.

A difference here in this claim is that it's done by frequency modulation; it means the width of the wave is modulated/variable. It's the width of the active part of the wave of the pulse which is used as the desired/wished tilt/angle value and the start of that pulse triggers the start of the pulse with the actual value. In discrete periods of time the slave controllers/CMOS logic units calculates/comparing the differences in width and then regulates the start and stop of the servo function until the difference is zero.

There is sometimes a demand to change the direction of the fluid between the pumps and the motors (3, 5). To avoid pass "through" zero angle of the swash plates (7,8) which can be tricky, one uses a directional, valve, 4 ways-2 positions, controlled by a solenoid and the "on" and "off" function mentioned above, transferred from one side of the two shafts. The other one could be utilized by an electrical charge pump.

I will call the master controller/processor and the rotating HST with its slave controllers a system. The master controller/processor and function needs program with algorithms. The verb of the master controller/processor function is to coordinate/match the "input parameters" to be "output parameters". The "input" to the master controller/processor are the parameters like torque (current) and speed of velocity of the electrical motor or generator and rotation direction. Another "input" is a 'fictive' desired/wished position/tilt angle of the swash plates (7, 8) in the HST from for example a person, see FIG. 3. It comes before the desired/wished position/tilt angle of the swash plates (7, 8) The 'fictive' desired/wished position/tilt angle of the awash plates could be a person's desired/wished request of new driving direction, to turn left, please accelerate, brake and the actual values of the torque of the motor, speed of velocity, Even other outside input could be involved, like a gyro. There are some no real actual values, like the actual position/angle of the awash plates back to the master controller. They show up like the value of the desired/wished tilt/angle of the swash plates (7, 8) plus a difference if they are not equal as the value of the desired/wished tilt/angle of the swash plates (7, 8). The desired/wished values had to be the actual values. The actual values are not hard linked to the wished as it could be a delay or not correspond to the desired/wished, but that's the way the controller has to work in it's final output.

The slip of one wheel and an algorithm in the master controller/processor to adjust it could be a function by the torque vectoring ability. The warning here would be from an actual value as the power in and a gyro. Output is the torque, velocity speed and the direction of the rotation motion and the desired/wished value of the angle of the two swash plates and some "on" or "off" signal. This is summarized/described in FIG. 3.

In a wind mill it may have another wished behavior, the desired/wished ratio of velocity speed and torque should perhaps be adjusted so the incoming power is delivered at a very constant velocity of speed. These are examples of functions in applications the master controller/processor can control by the facilities in this invention and how it works.

Figure 5:
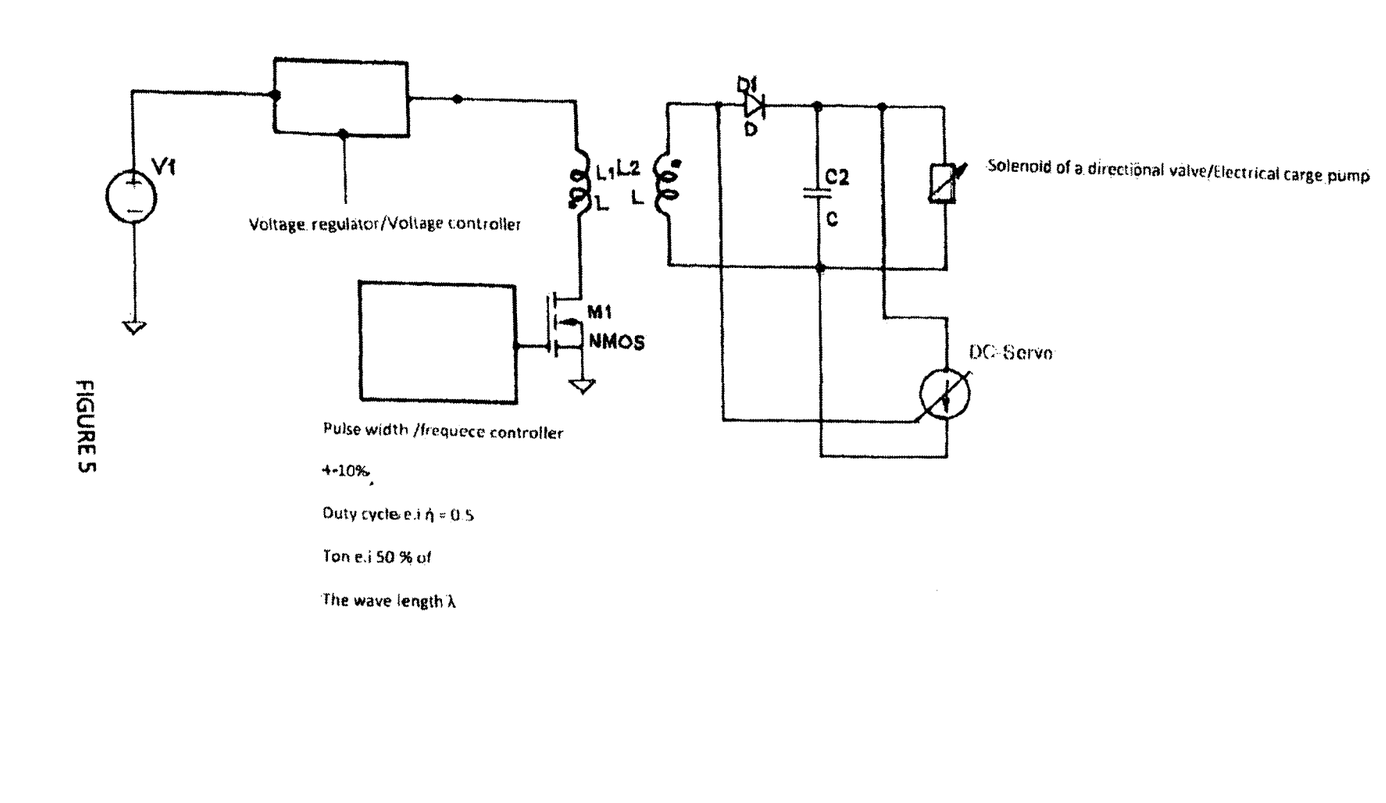
FIG. 5 shows a block diagram of frequency modulated wireless control of the split of power into and in a rotor.

Detailed Description of the Transfer of Regulated Power and Control Signals Wireless by Frequency Modulated Pulses, FIG. 5.

A voltage controller fed from a DC-source called V1 can shift the potential on the pulse to primary coil L1 via a MOSFET M1. The shift of the potential to two different levels of the pulse height to the primary coil L1 is done due to what potential is desired out of coil L2. An example could be to shift from 12 Volt to 8 Volt. The technique for that could be a Step down controller.

The "cutting" of the potential into pulses or pulse trains after MOSFET M1 is done by a frequency modulator, a PWM where you vary the frequency and at the same time the pulse width The primary coil L1 is supplied current and stores energy while the MOSFET M1 is turned on. The winding direction of the secondary coil and the polarity of the diode D1 are such that no current will be transferred while the MOSFET M1 is turned on. The total time between until the MOSFET M1 turn on, is called the cycle time and is variable out of the variable frequency and so the part (the width of the pulse) of the cycle time the MOSFET M1 leads. The later is called the active part (pulse) of the cycle time. The active part (pulse) is a constant part of the cycle time, for example 0.5. The ratio is called the duty-cycle. The cycle time vary for example +−10-20%.

Figure 6:
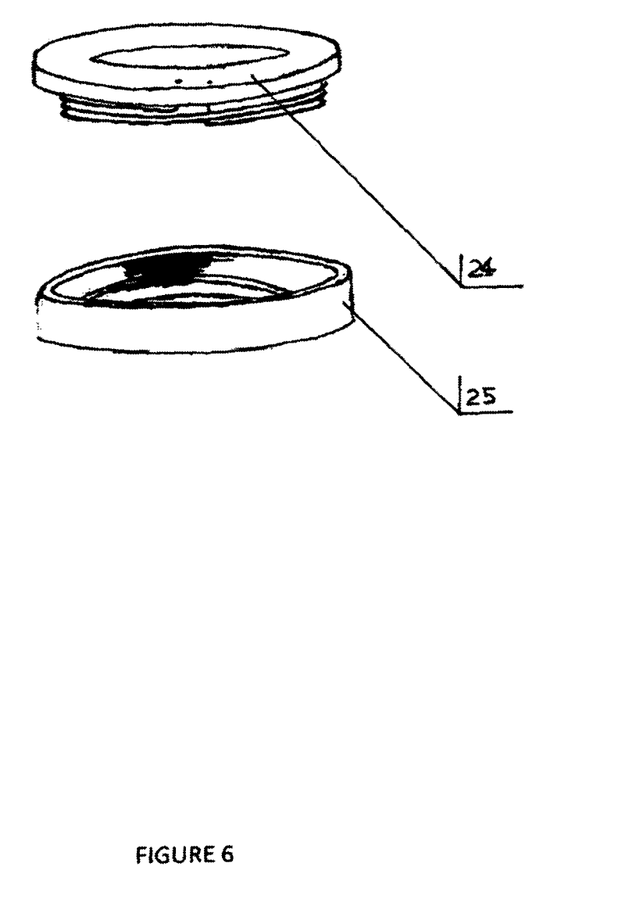
FIG. 6 shows different types of coils

According to Lenz law there is a back e.m.f built up in secondary coil L2 during the time the MOSFET M1 is turned on but it changes immediately direction when the primary coil no longer is supplied by current. The diode D1 now turns on. It means a current is supplied via D1 and is "flattened" by the capacitor C2 and now usable as a DC, for example of 8 V or 12 V. In FIG. 6 it feeds the solenoid of a hydraulic valve. The voltage/potential out on coil L2 is depended of the ratio of turns of the L1 coil and the L2 coil. For example if the number of turns of coil L1 is 6 and the L2 are 12 it will increase the voltage from 6V to 12V. The way how the L1 and L2 winding are wrapped around the core is important. It had to be according to FIG. 6. Notice that one end of each coil is marked with the same time.

The power for the slave controller/logics and servo and the variable power to for example the solenoid of the directional valve is transferred wireless to the shaft/stator inductively by a DC current by utilizing the energy in the pulse, The variable power is done by vary the height of the amplitude of the pulse. It's earlier called "voltage control" or "on" and "off".

It could be for example to control a directional valve with a solenoid, that's a way to shift the direction of the flow in a hydraulic system. When the voltage is shifted/decreased from 12V to 8V to the solenoid the ratio of the amplitude is shifted 12/8 and the 12V rated solenoid change the position of the piston in the valve to an other position. Different width of the pulse is utilized, as different signals, for example, of different value of desired/wished position/angle of the swash plate. A drop of voltage is done before the D1. The amplitude of the pulse is stabilized by zener diodes to say 5V. The positive ramp of the pulse together with a RC circuit creates a voltage peak which is used as a start trigger. This trigger also starts an internal pulse which by its actual width represents an actual value of the position/angle of the swash plate. By comparing these in controller/CMOS logics and when there is a difference the controller/CMOS logics order/command the servo function to adjust the difference to nil. A little hysterias round nil is to be desired.

FIG. 6 shows different shape the DC coils for wireless transfer of variable power and signals/information. The shape is important to minimize the leakage inductance at the transfer.

The invention claimed is:

1. A rotating hydrostatic transmission comprises a hydrostatic transmission in shaft/rotor (4) an outside the shaft/rotor situated master controller/processor to control and regulate from the outside incoming adjustable power or from the shaft/rotor delivered, wherein the master controller/processor even controls/regulates the split of the power to the two ends (2, 6) of the shaft/rotor or when the power comes in control and take care of the not adjusted power in at the two end ends of the shaft/rotor by controlling/regulating the split of velocity speed and torque ratio, the split is regulated by the angel of the swash plates (7, 8) which adjust the variable displacement in the axial piston pumps/motors (3, 5) with adjustable displacement, the control and regulation is done by transferring a signal of desired/wished position/angel of the swash plate into the shaft/rotor, the transfer is done by two separate pulse width modulated DC fed pulse trains, a different width of the of the pulse is utilized as different signals of the value of the angle, the value of the signal is compared in some slave controller/CMOS logics with an actual position/angel of the swash plate, when there is a difference, the difference is adjusted by a servo which gets its command from the slave controller, the master controller/processor can also switch on and off auxiliary equipment in the shaft/rotor like valves and charge pumps, the controlling/regulating is done inside shaft/rotor by two slave controllers and servo functions, the transfer of power and the on and off function is also done by the two separated DC energized pulse trains which also are voltage regulated, the energized pulse trains are coming in one from each end of the shaft/rotor mechanically via a commutator or contactless by induction from a fixed attached coil (24) over to coil (25) at the end of the shaft/rotor, and wherein one or more tanks/accumulators (1) take care of leakage oil from the case drain of the pumps/motors and also replenish the closed system with oil , the replenishment oil from the tanks/accumulator go by check valves (19, 20) to the inlet and outlet of the pumps/motors, in each inlet and outlet there is a relief valve (17, 18), and the pressure needed to load the tank and to allow charge oil to enter the closed circuit comes from the chase drain.

2. The rotating hydrostatic transmission of claim 1, wherein the pulse width modulated DC pulse trains with the voltage regulated amplitude are frequency modulated and in a topology as Flyback.

3. The rotating hydrostatic transmission of claim 2, further comprising a cylinder (14), a piston (99) and a compression spring (10) in the one or more accumulators /tanks, the piston and the compression spring work as a flexible wall between the oil and outside and balance an inside pressure , the piston (9) also works as relief valve in its rear position as there are holes (13) in the cylinder wall (14) which open passage for the fluid in the accumulator in front of the wall, and there is also an extra tank (11) designed like a flexible balloon to protect other parts around of general leakage of oil and in case of function as a relief valve it will gather out coming oil.

4. The rotating hydrostatic transmission of claim 3, wherein the control/regulating of the split of the power to the two ends of the shaft/rotor only utilizing one of the two possible separated DC energized pulse trains with variable width of the pulse and connect/link the two swash plates (6, 7) together, and utilize the other possible DC energized pulse train freely if needed.

5. The rotating hydrostatic transmission of claim 2, further comprising a charge pump (22) and a relief valve (23) between the filters (15, 21) after the case/housing drain of the pump/motor (3, 5) and before the tank/accumulator (1), to create the pressure need to to the check valves out to the closed system replenish the closed system with oil the outlet of the charge pump is the main and only supply.

6. The rotating hydrostatic transmission of claim 2, wherein the control/regulating of the split of the power to the two ends of the shaft/rotor only utilizing one of the two possible separated DC energized pulse trains with variable width of the pulse and connect/link the two swash plates (6, 7) together, and utilize the other possible DC energized pulse train freely if needed.

7. The rotating hydrostatic transmission of claim 1, further comprising a cylinder (14), a piston (99) and a compression spring (10) in the one or more accumulators /tanks, the piston and the compression spring work as a flexible wall between the oil and outside and balance an inside pressure, the piston (9) also works as relief valve in its rear position as there are holes (13) in the cylinder wall (14) which open passage for the fluid in the accumulator in front of the wall, and there is also an extra tank (11) designed like a flexible balloon to protect other parts around of general leakage of oil and in case of function as a relief valve it will gather out coming oil.

8. The rotating hydrostatic transmission of claim 7, further comprising a charge pump (22) and a relief valve (23) between the filters (15, 21) after the case/housing drain of the pump/motor (3, 5) and before the tank/accumulator (1), to create the pressure need to replenish the closed system with oil the outlet of the charge pump is the main and only supply to the check valves out to the closed system.

9. The rotating hydrostatic transmission of claim 7, wherein the control/regulating of the split of the power to the two ends of the shaft/rotor only utilizing one of the two possible separated DC energized pulse trains with variable width of the pulse and connect/link the two swash plates (6, 7) together, and utilize the other possible DC energized pulse train freely if needed.

10. The rotating hydrostatic transmission of claim 1, further comprising a charge pump (22) and a relief valve (23) between the filters (15, 21) after the case/housing drain of the pump/motor (3, 5) and before the tank/accumulator (1), to create the pressure need to replenish the closed system with oil the outlet of the charge pump is the main and only supply to the check valves out to the closed system.

11. The rotating hydrostatic transmission of claim 1, wherein the control/regulating of the split of the power to the two ends of the shaft/rotor only utilizing one of the two possible separate DC energized pulse trains with variable width of the pulse and connect/link the two swash plates (6, 7) together, and utilize the other possible DC energized pulse train freely if needed.

* * * * *